April 15, 1952
J. L. O'NEILL
2,592,592
DRAFT DEVICE FOR INCREASING THE
LOADING ON TRACTOR WHEELS
Filed Feb. 17, 1949
4 Sheets-Sheet 3
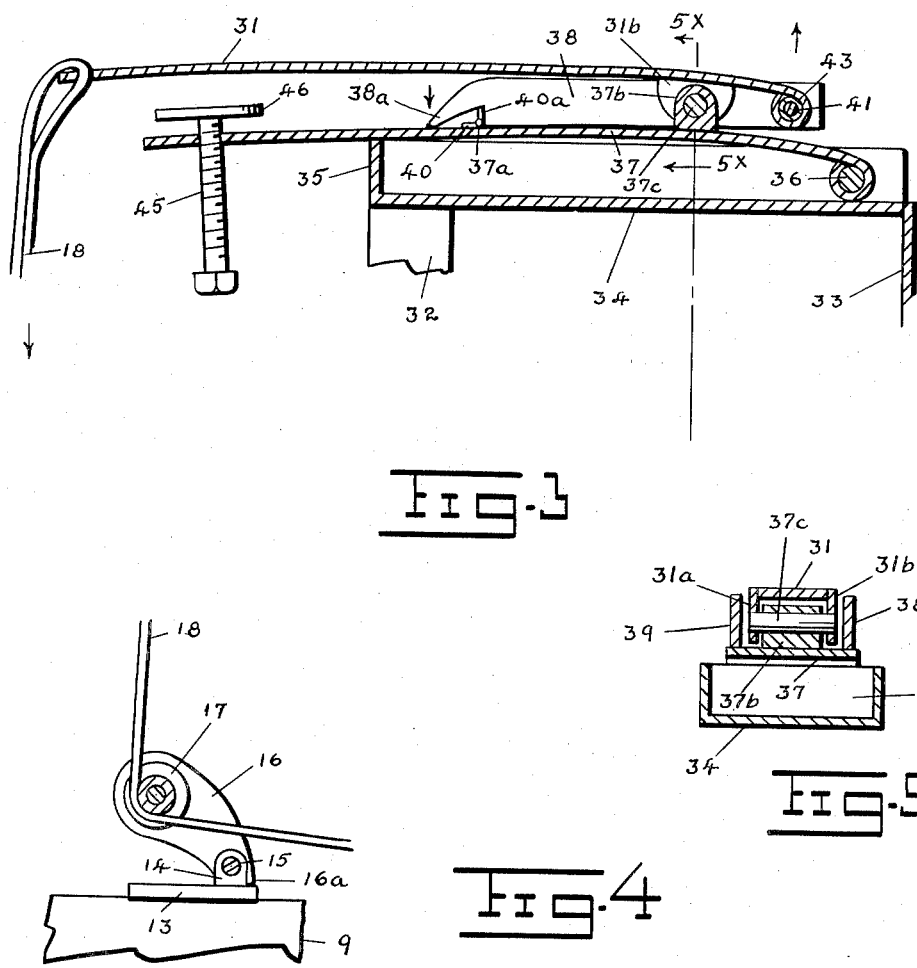
INVENTOR.
James L. O'Neill
BY
Frank Keefer
atty April 15, 1952     J. L. O'NEILL     2,592,592
DRAFT DEVICE FOR INCREASING THE
LOADING ON TRACTOR WHEELS Filed Feb. 17, 1949     4 Sheets-Sheet 4

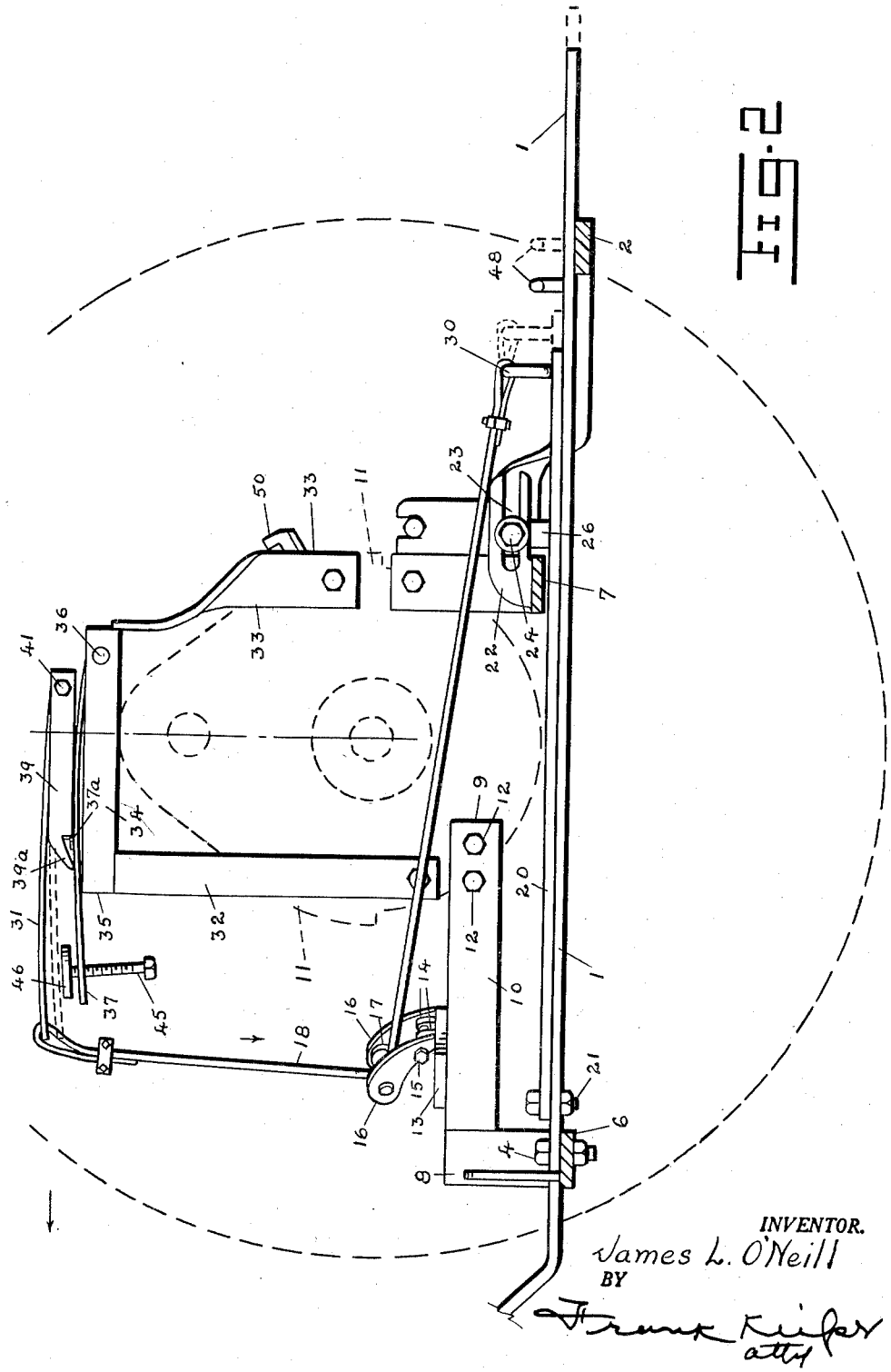

INVENTOR.
James L. O'Neill
BY
Frank Keiper
atty

Patented Apr. 15, 1952

2,592,592

UNITED STATES PATENT OFFICE 2,592,592

DRAFT DEVICE FOR INCREASING THE LOADING ON TRACTOR WHEELS

James L. O'Neill, Macedon, N. Y.

Application February 17, 1949, Serial No. 77,027

3 Claims. (Cl. 180—1)

Tractors are used in farming for the purpose of pulling plows or harrows or various other agricultural implements or tools. Sometimes, because the ground is hard or for other reasons, the ground offers such resistance that the tractor cannot pull the tools and the tractor wheels skid or slip. Tractors or autos are also used to pull trailers or loads on public highways and sometimes their wheels skid or slip.

To increase the tractive force of the tractor, the present practice is to add disc shaped weights to the outside of each of the tractor wheels and sometimes the inner tubes of the tractor wheels are filled with water or a solution of calcium chloride, calcium chloride being preferred because it does not freeze.

The object of this invention is to shift or increase the load on the rear or power tractor wheels so that they will take hold, and pull the tools without skidding without the use of these extra weights.

Another object of this invention is to shift or increase the load or traction on one or the other of the tractor wheels.

These and other objects of the invention will be illustrated in the drawings, described in the specification and pointed out in the claims at the end thereof.

Figure 2 is a section on the line $2x, 2x$ of Figure 1.

Figure 3 is an enlarged section on the line $3x, 3x$ of Figure 1.

Figure 4 is an enlarged detail sectional view of the support for the pulley shown in Figures 1 and 2.

Figure 5 shows a vertical section on the line $5x, 5x$ of Figure 3.

In the drawings, like reference numerals indicate like parts.

Figure 1:
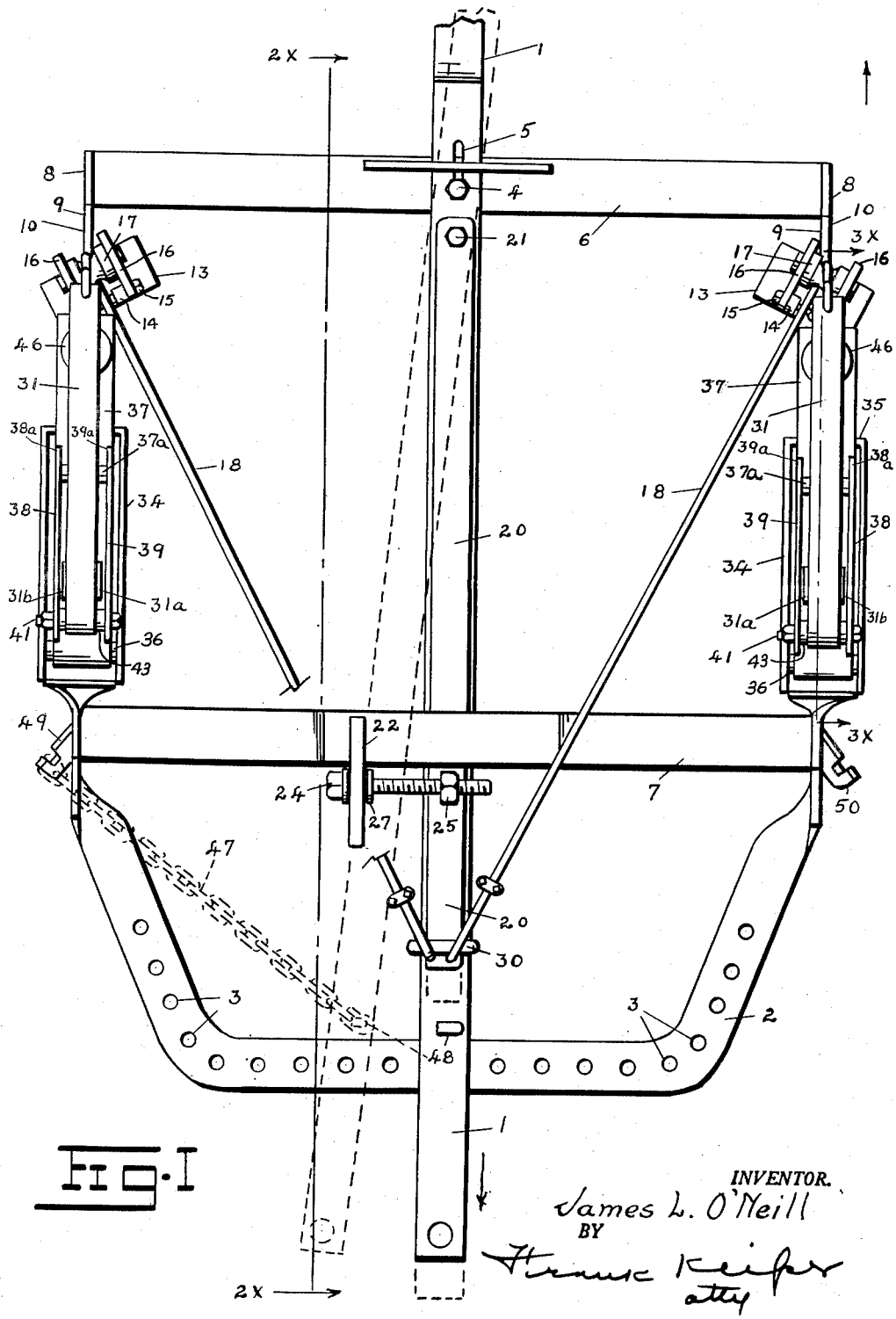
Figure 1 is a top plan view of my attachment to a tractor or other power unit.

In the drawings reference numeral 1 is the draw bar to which the tools, such as a plow, etc. are attached. This draw bar rests and swings on the bar 2 which is perforated with holes as indicated at 3, 3. Pins can be put through these holes on either side of the draw bar for the purpose of limiting the swing of the draw bar. This draw bar at its forward end is pivoted on the bolt 4 with which it has a sliding engagement on the cross bar 6 as indicated by the slot 5 in Figure 1. The forward end of the draw bar rests on the stationary cross bar 6 and passes under a stationary cross bar 7 and the rear end of the cross bar rests upon the semi-circular bar 2 as above explained. At each end of the cross bar 6 is placed an upright 8 having a rearward extension 9 which parts are welded together and form a bracket 10. See also Figure 2. At the right hand end as shown in Figure 2, each of these brackets is bolted to the housing 11 by the bolts 12, 12. This housing contains the gearing on the rear axle of a tractor.

Welded to the forward portion of each rearward extension 9 of the bracket 10 is a rectangular plate 13. On this plate is carried two lugs 14, 14. These lugs carry a bolt 15 on which are mounted to swing two arms 16, 16 between which is carried a pulley 17 around which pulley runs a cable 18.

The lower ends 16a, 16a of the arms 16, 16 strike the plate 13, limiting the upward movement of the pulley 17. A similar combination of brackets 10, bolts 12, 12, pulley 17 and supports therefor and cable 18 is provided on each side of this assembly, which is attached to the tractor and forms a part of my invention.

On top of the draw bar 1 as shown in Figures 1 and 2 of the drawing is placed a bar 20, which bar is shorter than the draw bar 1 and is pivotally connected to the draw bar by the bolt 21.

The rearward end of the draw bar 1 as shown in Figure 1 can swing with reference to the semi-circular bar 2, but the rearward end of the bar 20 cannot swing. It is firmly held to the cross bar 7 as follows:

On the cross bar 7 is welded a bracket 22 having an open slot 23 therein in which engages the stud 24. The threaded end of this stud engages with a nut 25 that is welded to a short bracket 26 which in turn is welded to the bar 20 shown in Figure 2. On the stud 24 is a collar 27 which loosely engages the far side of the bracket 22 so that the stud 24 is permitted a small endwise movement which is necessary to permit the bolt 21 to swing when the rearward end of the draw bar 1 swings as shown in Figure 1.

The slot 23 in the bracket 22 is made somewhat longer than the slot 5 in the draw bar 1 so that the stud 24 cannot get out of engagement with the slot 23.

When the draw bar 1 swings, it swings on the pivot or center 4. The draw bar 1 carries the bolt 21 with it and swings slightly the forward end of the bar 20 as shown in Figure 1. The rearward end of the bar 20 is to some extent held against swinging by the nut 25 and by the ends of the cables 18, 18 which are fastened to the ring 30, which ring is welded to the rearward end of the bar 20. The rearward end of the bar 20 swings on a center that is located either in the nut 25 or the ring 30 or a center somewhere between the two. The draw bar 1 when moved to the right of left in Figure 1, according to the tool being drawn, does not change the adjustment of the bar 20 and its cables 18 to any extent. When the tractor wheels move the tractor forward the draw bar is held back by the load. The draw bar then pulls on the cables and pulls the free end of the upper spring down.

By turning the stud 24, the nut 25 is drawn either to the right or left, increasing the tension on one of the cables 18 and decreasing the tension on the other cable 18. By increasing the tension on the right cable the pull of the implement is increased on the right cable and increases the traction of the right rear tractor wheel.

As the cable 18 extends around the pulley 17 and extends upwardly, it is engaged with the left hand end of the blade spring 31 so that a movement of the ring 30 in Figure 2 to the right will pull the free end of this right hand spring 31 of Fig. 1 down and a movement of the ring 30 to the left in Figure 2 will allow the free end of said spring 31 to move up.

The right hand end of this spring 31 as seen in Figs. 2 and 3 is supported as follows: Bolted to one side of the housing 11 is an upright strap 32 and bolted to the other side of the housing is an upright twisted strap 33. To the ends of these uprights is welded a channel 34, which channel is closed at the left hand end as shown at 35 in Figure 3. In the channel 34 is a pivot 36 on which is mounted a blade spring 37. This blade spring at a point near the left hand end rests on the closed end 35 of the channel 34, which serves as a fulcrum or support for the left hand end of the spring 37.

Welded to the spring 31, as shown in Figure 5, are two downwardly extending lugs 31a and 31b. Welded to the top of the spring 37 is the block 37b that extends upwardly between the lugs 31a and 31b. A pin 37c passes through the lugs 31a and 31b and the block 37b connecting them together and forming a pivot connection between the spring 31 and the spring 37. About midway of the length of the spring 37 is welded one leaf 40 of a hinge 37a, the other leaf 40a of the hinge being welded to the two upright bars 38 and 39 which bars with the leaf spring form a sort of a channel. The bars 38 and 39 extend beyond the hinge 37a forming the lugs 38a and 39a. These bars are connected at the right hand end by the bolt 41. The bars are spaced apart by the sleeve 43, which is carried on the bolt 41. The right hand end of the spring 31 is wrapped around this sleeve 43 and is pivoted on the sleeve. As is shown in Figure 3 when the cable 18 is tightened or drawn down, the left hand end of the spring 31 is drawn down. The spring 31 rocks on the pivot pin 37c and raises the right hand end of the spring, the pin 41 and the right hand end of the two bars 38 and 39. The bars 38 and 39 will swing on the hinge 37a and depress the extended lugs 38a and 39a, so that they give a downward thrust on the so-called spring 37 which spring is very stiff.

When tension is applied to one of the cables 18 as above described, the lugs 38a and 39a are pressed down on the so-called spring 37, which spring 37 is very stiff.

It will be remembered that the assembly shown in Figure 3 appears on both sides of the tractor as shown in Figure 1. When the bar 20 is held centrally between the wheels or between the two assemblies, then the springs 31, 31 will be drawn down equally and if the bolt 24 is turned so as to move the nut 25 and the bar 20 to one side or the other, then the springs 31, 31 will be drawn down unequally.

It will be understood that the lugs 38a and 39a are preferably located over the axle on which are mounted the rear wheels of the tractor (not shown) so that it would cause a downward thrust on those wheels.

Threaded into the spring 37, near the end thereof, is a stud 45 having a disc 46 on the end thereof. This disc is raised or lowered by turning the disc or stud 45 and it acts as an adjustable stop for the end of the spring 31.

It sometimes happens that it is necessary to shift the draw bar to the right or the left in the ordinary use of the tractor according to the tools that it draws or according to the slant of the ground over which it is travelling. It is necessary to hold the draw bar in its adjusted angular position by putting a pin on each side of it which pins engage the holes 3, 3 in the semi-circular bar 2 as above described. When pulling on a side hill it is desirable to place more weight on the upper wheel. For this purpose I provide a chain 47 which is fastened at its lower end to the hook 48 from the draw bar and its upper end to either the hook 49 or 50, depending on which way the draw bar is swung.

The operation of my device is as follows: Assuming that a farm tool is attached to the draw bar 1 at the bottom of Figure 1 and at the right in Figure 2 and the tractor with the assembly shown in Figures 1 and 2 is moved in the direction of the arrow in each figure, the draw bar is moved to the right in Figure 2 and down in Figure 1 to the position shown in dotted lines, relative to the assembly, but not to the limit of the length of the slot 5 shown in Figure 1.

This pulls the cables 18 down in Figure 1 and to the right in Figure 2 and puts tension on them and flexes the spring 31 as shown in Figure 2. This puts a downward thrust on the springs 37, as above described, which are located over the shaft of the traction wheels and increases the traction of the traction wheels.

Figure 6:
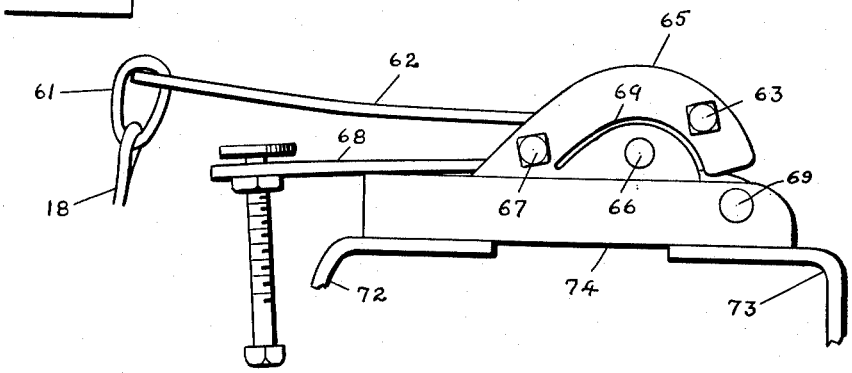
Figure 6 is a side elevation of a modification of the mechanism shown in Figure 3.
Figure 7:
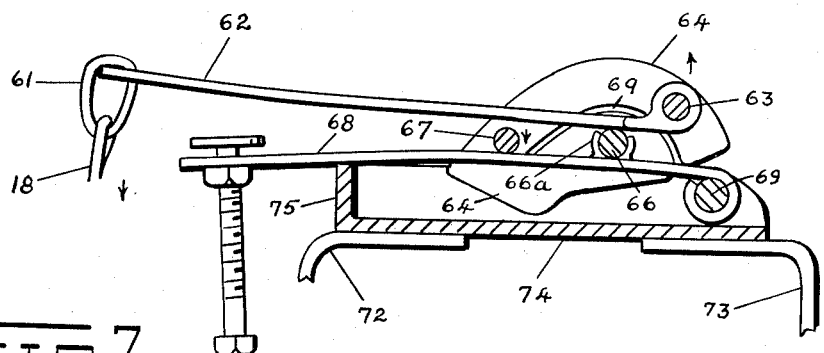
Figure 7 is a section of the parts shown in Figures 6 and 8, the section being taken on the line $7x, 7x$ of Figure 8.
Figure 8:
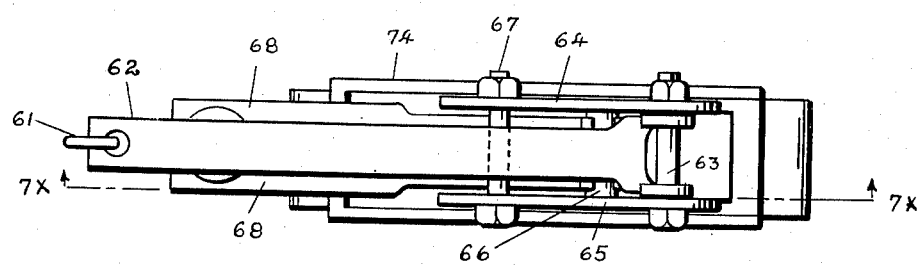
Figure 8 is a top plan view of the parts shown in Figures 6 and 7.

In Figures 6, 7 and 8 I have shown a modified or substitute form of the details of the unit shown in Figure 3.

As shown in Figures 6 and 7, a cable 18 is attached to a ring 61, which is connected to the spring 62, which spring is pivoted on the pin 63 which pin is supported between the upright plates 64 and 65. These plates 64 and 65 are pivoted on the pin 66 and they carry between them the pin 67 which rests on the stiff spring 68, which spring is pivoted on the pin 69. The pin 66 is supported by the bearing block 66a welded to the top of the spring 68. The plates 64 and 65 each have a curved slot 69 cut therein which weakens each of the plates so that the upper part of the plates 64 and 65 can spring on the lower part of the plate, the lower part of the plate being held down by the pin 66 and the upper part of the plates being raised slightly by the pin 63 when the cable 18 is pulled down. As the pin 63 and the upper portions of slotted plates 64 and 65 are raised, the pin 67 bears down on the stiff spring 68 and this in turn bears down on the channel 74, 75. This is welded to the two brackets 72 and 73 which correspond to the channel 34 and brackets 32 and 33 of Figure 2 and would be bolted in any suitable manner to the stationary housings over the rear wheels of the tractor.

I claim:

1. In a tractor having tractor wheels, bearings therefor, an axle mounting said wheels and bearings and a housing for said axle, said tractor wheels supporting the load, and apparatus for increasing or decreasing the load on the tractor wheels comprising a bracket mounted forward of and a bracket mounted rearward of the bearing of each of the tractor wheels, said brackets being placed on said housing and extending thereabove, parallel plates supported on said brackets, a pivot mounted on said parallel plates and extending therebetween and on one side of said bearings, a lower spring pivotally mounted on said pivot and extending between said plates over the first-named bracket and being supported on said first-named bracket, a second pair of parallel plates mounted on said lower spring, an upper spring between said second pair of plates and extending across the wheel bearing and over the first-named bracket, a second pivot between said second pair of plates over the wheel bearing, said upper spring being connected to said second pair of parallel plates by said second pivot, the forward end of said second pair of plates being pivotally connected to said first-named lower spring and having lugs thereon that extend forwardly beyond and over said last-mentioned pivotal connection and bear on the first-named lower spring.

2. In a tractor having tractor wheels, bearings therefor, an axle mounting said wheels and bearings and a housing for said axle, said tractor wheels supporting the load, and apparatus for increasing or decreasing the load on the tractor wheels comprising a bracket mounted forward of and a bracket mounted rearward of the bearing of each of the tractor wheels, said brackets being placed on said housing and extending thereabove, parallel plates supported on said brackets, a pivot mounted on said parallel plates and extending therebetween and on one side of said bearings, a lower spring pivotally mounted on said pivot and extending between said plates over the first-named bracket and being supported on said first-named bracket, a second pair of parallel plates mounted on said lower spring, an upper spring between said second pair of plates and extending across the wheel bearing and over the first-named bracket, a second pivot between said second pair of plates over the wheel bearing, said upper spring being connected at one end to said second pair of parallel plates by said second pivot, the forward end of said second pair of plates being pivotally connected to said first-named lower spring and having lugs thereon that extend forwardly beyond and over said last-named pivotal connection and bear on the first-named lower spring, a cable attached to the extreme free end of said upper spring, a pulley secured to said housing below the end of the upper spring, around which pulley the cable extends, a drawbar on said tractor, a short bar pivotally connected at the forward end thereof to the drawbar, said cables being attached to the rear end of said second-named bar and being pulled rearwardly thereby on the forward movement of the tractor wheels.

3. In a tractor having tractor wheels and the assembly of a framework, housing and power mechanism and an axle connecting the tractor wheels to the said assembly, in combination, a drawbar to which a load is attached, means pivotally securing the drawbar to said assembly, means for increasing the loading on the tractor wheels and axle on the forward movement of the tractor, said means including a cable drawn rearwardly at one end by the drawbar and the load attached thereto and secured to the rearward portion of said drawbar, a blade spring pivotally mounted on said housing above the axle and extending forward of the axle, the other end of said cable being attached to the forward end of said spring and being adapted to draw the forward end of the spring down, a stop for arresting the downward movement of said spring whereby loading on the axle is increased, means securing said stop to said housing, and a pulley on said housing around which the intermediate part of the cable travels.

JAMES L. O'NEILL.

REFERENCES CITED

The following references are of record in the file of this patent:

UNITED STATES PATENTS

| Number | Name | Date |
|---|---|---|
| 1,699,397 | Klein | Jan. 15, 1929 |
| 2,347,898 | Ferguson | May 2, 1944 |

FOREIGN PATENTS

| Number | Country | Date |
|---|---|---|
| 148,319 | Switzerland | Sept. 16, 1931 |
| 584,335 | Germany | Sept. 18, 1933 |